T. CRANEY.
APPARATUS FOR THE TREATMENT OF SEWAGE.
APPLICATION FILED FEB. 24, 1914.
1,134,107.
Patented Apr. 6, 1915.
2 SHEETS—SHEET 1.
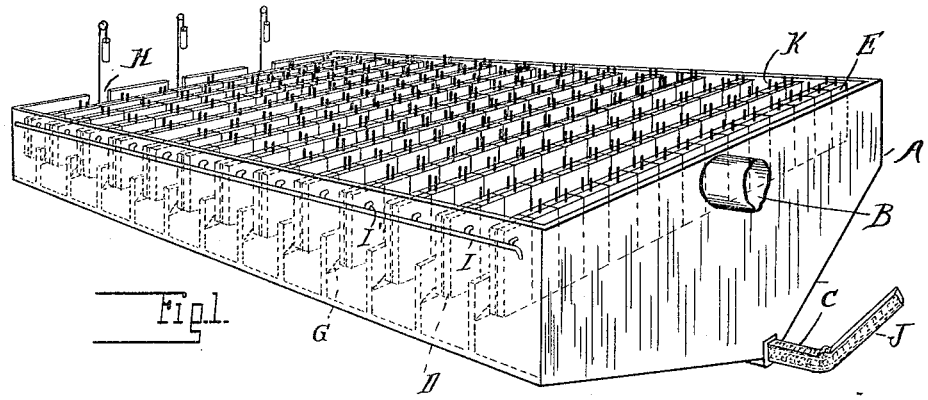
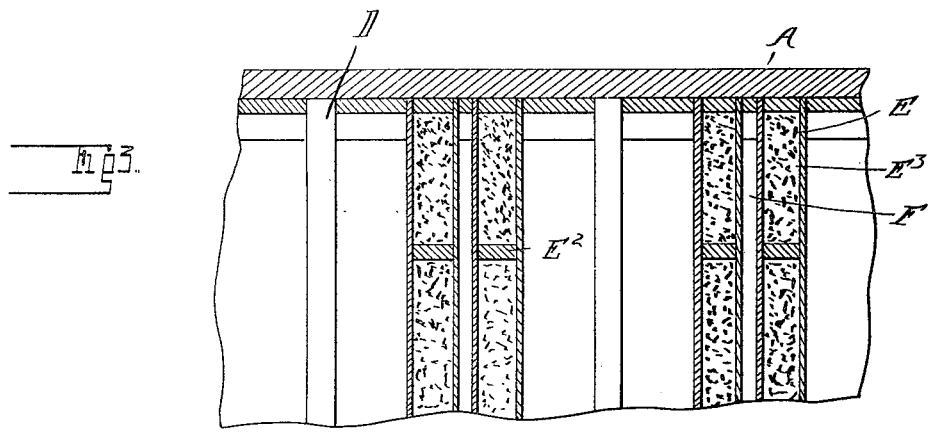
WITNESSES:
INVENTOR
Thomas Craney.
BY
Whittemore Hulbert + Whittemore
ATTORNEYS T. CRANEY.
APPARATUS FOR THE TREATMENT OF SEWAGE.
APPLICATION FILED FEB. 24, 1914.
1,134,107.
Patented Apr. 6, 1915.
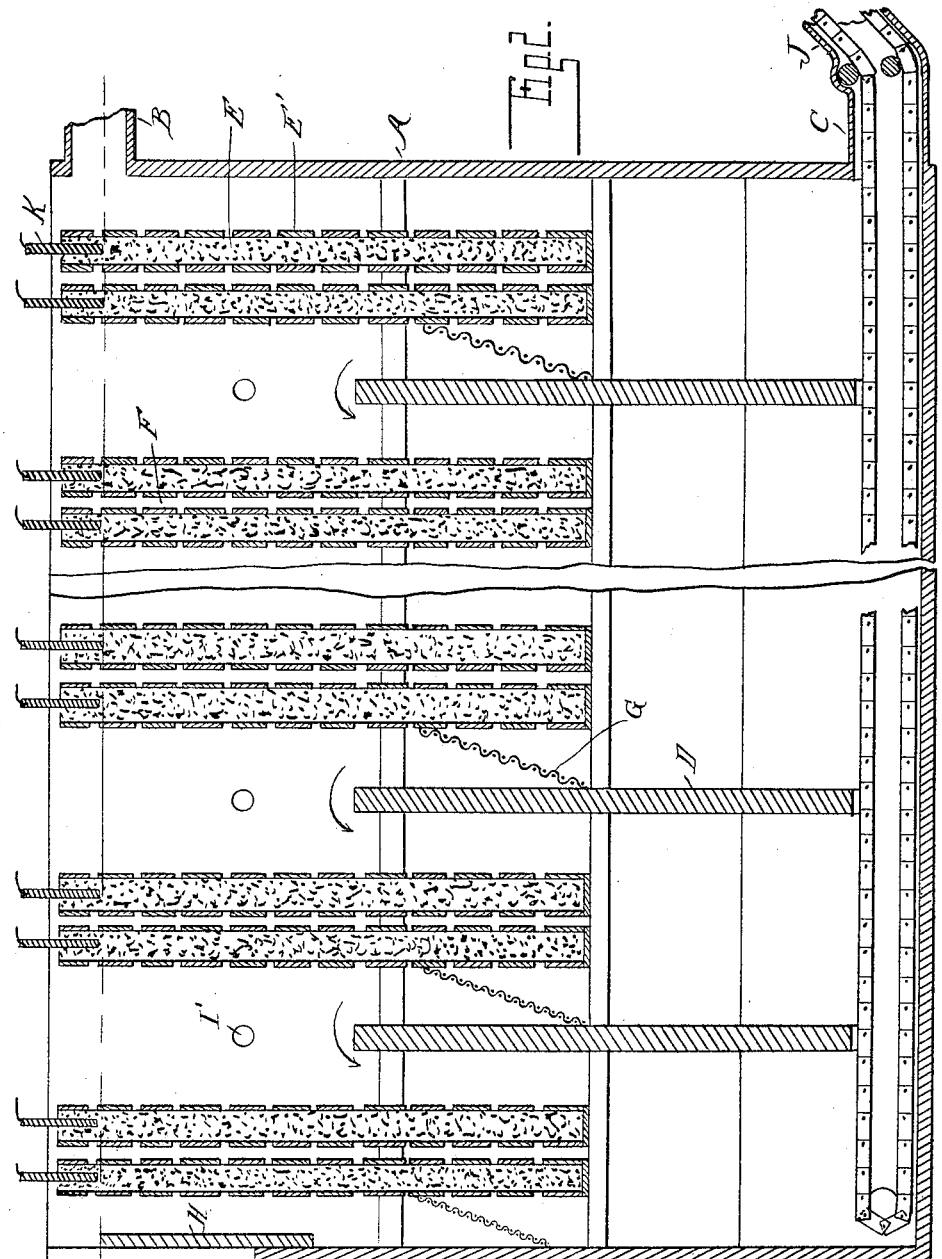
WITNESSES:
W. K. Ford
C. B. Belknap
INVENTOR
Thomas Craney
BY
Whittemore Hulbert & Whittemore
ATTORNEYS

UNITED STATES PATENT OFFICE.

THOMAS CRANEY, OF BAY CITY, MICHIGAN.

APPARATUS FOR THE TREATMENT OF SEWAGE.

1,134,107.  Specification of Letters Patent.  Patented Apr. 6, 1915.

Application filed February 24, 1914. Serial No. 820,653.

*To all whom it may concern:*

Be it known that I, THOMAS CRANEY, a citizen of the United States of America, residing at Bay City, in the county of Bay and State of Michigan, have invented certain new and useful Improvements in Apparatus for the Treatment of Sewage, of which the following is a specification, reference being had therein to the accompanying drawings.

The invention relates to apparatus for the treatment of sewage and other refuse matter, and has for its object, first, the separation of the solid from the liquid constituents, and further the sterilizing of the liquid before it is finally discharged, thereby avoiding danger of contagion.

In the drawings: Figure 1 is a perspective view of the apparatus; Fig. 2 is a longitudinal section therethrough; and Fig. 3 is a fragmentary sectional plan view.

A is a suitable vat or receptacle, into one end of which sewage is led through an inlet conduit B. This vat is preferably provided with a hopper-shaped bottom, and a conveyer C is arranged to remove the solid matter collecting in this hopper. The vat is also divided into a series of compartments by cross partitions D, which extend from the bottom upward.

Between the partitions D there are arranged within the several compartments transversely-extending trays E for holding electrodes. These are preferably formed of boards or planks E' separated from each other by vertical strips E² and forming a series of pockets E³, which may be filled with granular carbon or other suitable material for an electrode. The trays are formed in pairs and are secured within the compartment slightly spaced from each other, as indicated at F, so as to prevent danger of short circuiting.

Between the trays E and the partitions D there are arranged screens or filters G for separating the solid matter from the liquid in the upward path of the current. These screens or filters are progressively of finer mesh, so that the coarser material is separated and remains in the first of the compartments, and progressively finer material is separated in each of the succeeding compartments. At the opposite end of the vat are arranged gates H, which may be raised or lowered to establish the desired liquid level and which permit the overflow of liquid to be discharged from the vat. There is also arranged along the side of the tank a conduit I connected by tubes I' with each of the compartments near the liquid level therein and serving the purpose of carrying off the floating grease which may be conveyed to a suitable receptacle therefor (not shown).

With the construction as thus far described in use, the electrodes in the adjacent pairs of trays which occupy the same compartment are connected respectively to the positive and negative leads from a source of electrical energy. The voltage is comparatively low, but is nevertheless sufficient to produce an electrolytic action which decomposes certain salts forming constituent parts of the liquid. This will have the effect of producing a disinfecting or germicidal liquid, which is commingled with the stream passing alternately downward and upward adjacent to the trays and over the partitions D. As has been stated, the solid material will be separated by the screens or filters, while the remaining liquid will pass onward from compartment to compartment and before being finally discharged will be completely sterilized. This effect is produced by the successive electrolytic treatments in each of the compartments and the germicidal substances which are formed by the electrolysis.

The solid material which collects in each of the compartments will gradually settle to the bottom and pass downward along the inclined sides of the hopper until it comes into proximity to the conveyer C. This is slowly operated to carry the material outward through a suitable conduit J, and when discharged it may be passed to an incinerator or disposed of in any other manner.

The current is conveyed to the material in the various pockets through suitable connections, such as the carbon or graphite rods K, extending downward and imbedded in the material, while metallic conductors (not shown) may be attached to this carbon rod. In place of forming the trays from wood, they may be formed of unglazed crockery, or other porous and non-metallic material, supported by any suitable frame.

While my apparatus is primarily designed for the treatment of sewage, it is obvious that it may be used for purifying or sterilizing liquids of any kind and may be even used in the purification of water. For such purpose the screens or filters G are finer and serve to remove the suspended particles from the water, while the electrical treatment will sterilize the same.

What I claim as my invention is:—

1. An apparatus for the treatment of liquids containing solid matter, comprising a vat having a series of transversely-extending partitions extending from the bottom upward to form a series of compartments communicating with each other above said partitions, positive and negative electrodes arranged in adjacent pairs and extending across the vat, depending in each compartment between partitions, and a separate screen or filter arranged in inclined position between the partition and electrodes on the ascending side of the liquid current for separating the solid from the liquid matter.

2. An apparatus for treating liquids containing solid matter, comprising a vat having a hopper-shaped bottom, a series of cross partitions in said vat dividing the same into compartments communicating with each other above said partitions, trays for holding positive and negative electrodes arranged in pairs and extending across the vat, depending in each compartment thereof, thereby compelling the liquid passing through the vat to take a zigzag course about said electrodes and partitions, screens or filters arranged between said electrodes and partitions in the path of the upwardly-directed liquid current, and a conveyer extending along the hopper bottom of said vat for removing the separated solid matter from the several compartments.

3. An apparatus for the treatment of liquids containing solid matter, comprising a vat having a hopper bottom, a series of cross partitions in said vat dividing the same into separate compartments communicating with each other over the tops of the partitions, a series of trays extending transversely of the vat intermediate said partitions, separated pairs of cells formed by said trays adjacent to each other filled with conducting material forming electrodes, and means for connecting the electrodes of adjacent pairs respectively to the positive and negative leads of a source of electrical energy.

4. An apparatus for the treatment of liquids containing solid matter, comprising a vat provided with a plurality of compartments having communication with each other, positive and negative electrodes arranged in each compartment in the path of the material to be treated, a means for establishing the desired liquid level within said vat, and a conduit extending longitudinally of said vat and communicating with each of said compartments for carrying off any floating substance on the surface of said liquid.

5. An apparatus for the treatment of liquids containing solid matter, comprising a vat, a series of transversely extending partitions in said vat dividing the same into separate compartments, means for passing the material to be treated through said vat, positive and negative electrodes arranged in the path of the material passing therethrough, and a separate screen arranged between said electrodes and a partition in each compartment, the screens in said compartments being of progressively finer mesh throughout the vat.

6. An apparatus for treating liquids containing solid matter, comprising a vat provided with a series of cross partitions dividing the same into compartments communicating with each other above said partitions, and pairs of positive and negative electrodes depending into said compartments and extending across the vat, said partitions and electrodes compelling the liquid passing through the vat to take a zigzag course.

7. An apparatus for treating liquids containing solid matter, comprising a vat having the lower portion thereof divided into a series of compartments by a series of cross partitions, the upper portion thereof being one compartment, and a plurality of pairs of substantially solid parallelly-extending spaced electro-positive and negative electrodes arranged in the upper compartment and extending across said vat, said pairs of electrodes depending into the series of compartments in the lower portion of said vat between said partitions, said electrodes and cross partitions being adapted to compel the liquid passing through said vat to take a zigzag course.

In testimony whereof I affix my signature in presence of two witnesses.

THOMAS CRANEY.

Witnesses:
JAMES P. BARRY,
PHYLLIS COBURN.

Copies of this patent may be obtained for five cents each, by addressing the "Commissioner of Patents, Washington, D. C."